Nov. 19, 1940.　　　　P. A. KELLOGG　　　　2,221,974
STOCK FEEDER
Filed July 10, 1939
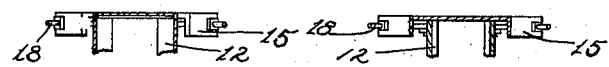
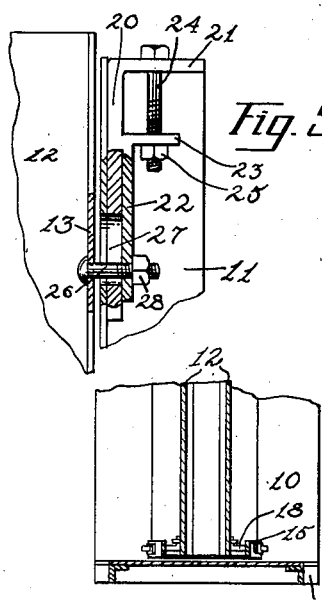
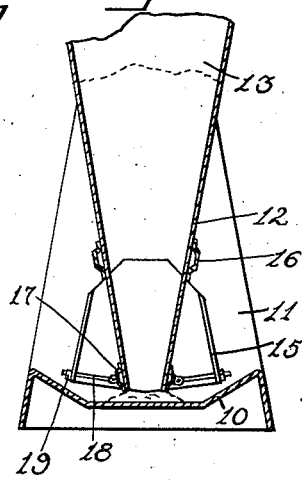
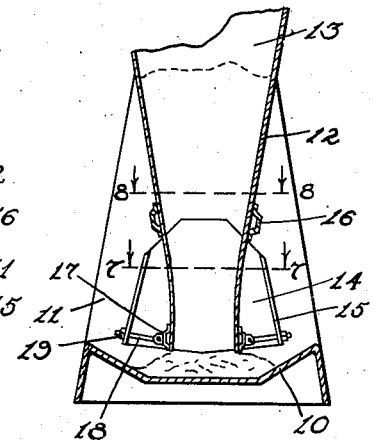
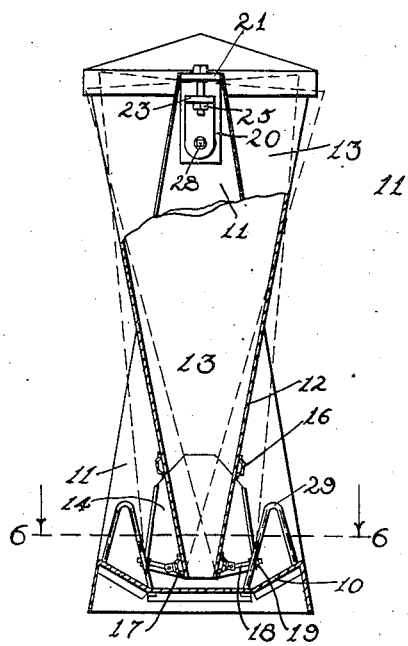
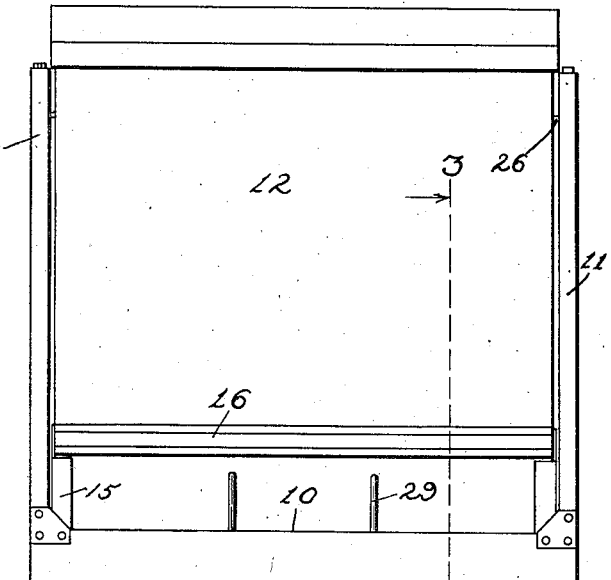
Inventor.
Phelps A. Kellogg
by Orwig & Hague Att'ys Patented Nov. 19, 1940

2,221,974

UNITED STATES PATENT OFFICE 2,221,974

STOCK FEEDER

Phelps A. Kellogg, Alden, Iowa

Application July 10, 1939, Serial No. 283,521

2 Claims. (Cl. 119—53.5)

The object of my invention is to provide a stock feeder of simple, durable and inexpensive construction which may be readily, quickly and easily adjusted for feeding relatively small animals or relatively large animals, and which when in any position of its adjustment will be actuated by the animals to deliver feed to the trough only in such quantities as are being eaten by the animals at the time, to thereby avoid wasting the feed.

Referring to the accompanying drawing, Figure 1 shows an end elevation of my improved feeder with a portion of the end of the frame and the end of the hopper broken away;

Figure 2 shows a side elevation;

Figure 3 shows a vertical sectional view on the line 3—3 of Figure 2;

Figure 4 shows a similar view with the lower end portions of the hopper sides in an expanded position;

Figure 5 shows an enlarged detail view, partly in vertical section, illustrating the means for pivotally supporting and adjusting the hopper relative to the frame;

Figure 6 shows a detail horizontal sectional view on the line 6—6 of Figure 1, showing only a part of the hopper and trough;

Figure 7 shows a detail sectional view on the line 7—7 of Figure 4;

Figure 8 shows a similar view on the line 8—8 of Figure 4.

My improved feeder comprises a trough, indicated generally by the reference numeral 10 and having a substantially horizontal central portion with the sides of the trough inclined upwardly and outwardly. At the ends of the trough are the upright frame members 11 fixed to the trough.

The hopper is formed of sheet metal and comprises side members 12 and end members 13. It is open at its upper and lower ends, and the sides are tapered downwardly and toward each other, leaving a relatively narrow opening at the bottom of the hopper extending the full length of the hopper.

At the lower portion of each end member I have fixed a plate 14 having flanges 15. These flanges are spaced apart a considerable distance from the adjacent portions of the hopper sides 12, as shown in Figure 4.

On the outer surface of the hopper sides 12, spaced above the lower edges thereof, are the reinforcing braces 16 fixed to the side walls of the hopper. Below these braces 16 the side walls of the hopper are disconnected from the ends of the hopper, as shown in Figure 7, and above the braces 16 the end walls of the hopper are fixed to the sides 12, as shown in Figure 8. This leaves the lower ends of the side walls relatively free to be moved toward or from each other, due to the flexibility of the sheet metal sides.

For the purpose of adjustably securing the lower ends of the hopper sides in various positions relative to each other I have provided at each end of the hopper a lug 17, and to this lug I have hooked a bolt 18. This bolt extends through the flange 15 and has a nut 19 on its outer end. This nut extends through and is free to rotate within the flange 15, and on its inner end is a collar which engages the inner surface of the flange 15 and the nut is secured to the bolt. By this means an adjustment of the nut causes the lower edge of the hopper side to be moved inwardly or outwardly and to be secured in any position of its adjustment.

The means for pivotally and adjustably securing the hopper to the frame members comprises a bracket 20 fixed to the upper outer surface of the frame, having an outwardly extended lug 21 at its upper end, as shown in Figure 5.

Mounted upon the bracket 20 is a second bracket 22 having an outwardly extended flange 23 at its upper end. A bolt 24 is passed through both brackets and has a nut 25 at its lower end. By adjusting the nut 25 the bracket 22 may be moved upwardly and downwardly relative to the bracket 20. A bolt 26 is extended through an opening in the bracket 22 and through a vertically arranged slot 27 in the bracket 20 and the adjacent portion of the frame 11, and is also extended through the adjacent portion of the hopper end 13, and the said bolt 26 has a nut 28 thereon. This permits the hopper to freely rotate relative to the bolt 26.

Partition members are provided in the outer portions of the trough, consisting of inverted U-shaped rods 29 fixed to the trough at spaced apart positions.

In practice I have demonstrated that when it is desired to feed small animals, such as young pigs, the lower edges of the trough sides are adjusted to their maximum limit of movement toward each other, then the hopper is filled with the feed and forms a relatively thin column of feed extending from the bottom of the trough upwardly into the hopper, as shown in Figure 3. The advantage of this relatively thin column of feed is, that small animals will first eat away as much of the feed in the trough as they can reach, and then they will push against the side wall of the hopper and swing it laterally so that more feed is deposited within the trough, and because this column of feed is relatively thin, a small animal has sufficient power to swing the hopper and cause it to deliver more feed.

When, however, I desire to feed large animals, such as full-grown hogs, the adjacent side walls of the hopper are moved to their limit away from each other, as shown in Figure 4. This will cause the feed within the hopper to form a relatively thick column from the bottom of the trough upwardly, and this column of feed causes the hopper to be held in a stationary position unless and until a considerable amount of force is applied to the side of the hopper to thereby cause it to be moved laterally and deposit more feed, and since it requires considerable pressure to swing the hopper into such position I have demonstrated that full-sized hogs will not accidentally swing the hopper and thereby distribute an excessive amount of feed upon the trough but they will swing the hopper only after the feed in the trough that is available has been eaten up, and then seeking more food, they will push against the hopper with enough pressure to cause it to swing.

When the hopper is adjusted either to the position shown in Figure 3 or the position shown in Figure 4 it may be raised or lowered relative to the trough, by the adjusting bolts 24, to adapt it to deliver the desired amount of feed into the trough; and this adjustment is necessary for different kinds of feed, some of which flow more readily than others.

I have demonstrated that with my improved feeder there is practically no waste of feed due to excessive quantities being delivered into the trough and scraped out of the trough by the animals' feet.

I claim as my invention:

1. A stock feeder, comprising a frame, a feeding trough at the lower portion of the frame, a hopper pivotally mounted in the frame with its lower end open to discharge into the trough, whereby the pressure of animals against the hopper when feeding from the trough will swing the hopper from side to side and thereby discharge feed from the hopper to the trough, means for adjusting the discharge end of the hopper from position with its side walls relatively close together to thereby discharge a relatively thin column of feed to the trough to a position with the side walls of the hopper at the delivery end widely separated to deliver a thick column of feed being delivered and for fixing the discharge end of the hopper in its various positions of adjustment to thereby maintain the same thickness of the column of feed during the swinging movements of the hopper, and means for vertically adjusting the pivotal support of the hopper to vary the size of the space between the hopper and the trough, said means for pivotally and adjustably supporting the hopper, comprising a device at each end of the hopper consisting of a bracket fixed to the frame and having an outwardly extended flange at its upper end, a second bracket slidingly mounted on the first bracket and having an outwardly extended flange at its upper end, a bolt extended through said flanges for adjusting them relative to each other, and a bolt extended through said brackets and through the hopper and frame, the said first bracket and the frame being formed with slots for said bolt for adjustably securing the hopper in various positions and to permit free swinging movement of the hopper.

2. A stock feeder, comprising a frame, a feeding trough at the lower portion of the frame, a hopper pivotally mounted in the frame with its lower end open to discharge into the trough, whereby the pressure of animals against the hopper when feeding from the trough will swing the hopper from side to side and thereby discharge feed from the hopper to the trough, said hopper having upright end members and bendable side members, the upper portions of the side members being fixed to the end members and the lower portions of the side members being free to be bent toward and from each other, plates fixed to the lower portions of the hopper ends and extended outwardly beyond the hopper sides, and having flanges at their outer edges and adjusting bolts connected with the hopper sides and extended through said flanges.

PHELPS A. KELLOGG.